May 21, 1968 D. T. N. WILLIAMSON ET AL 3,384,755
OPTICAL INSPECTION DEVICES

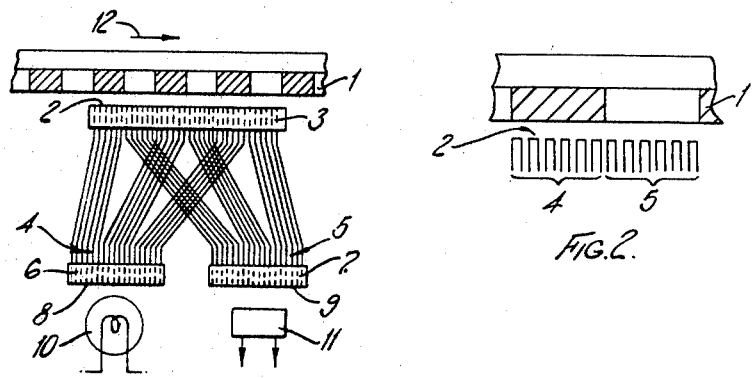
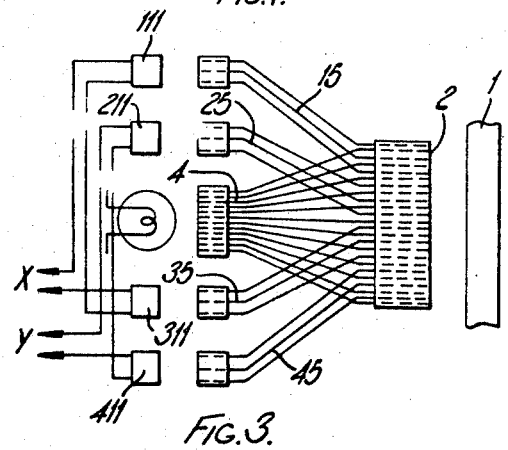
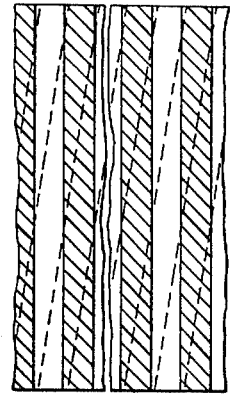
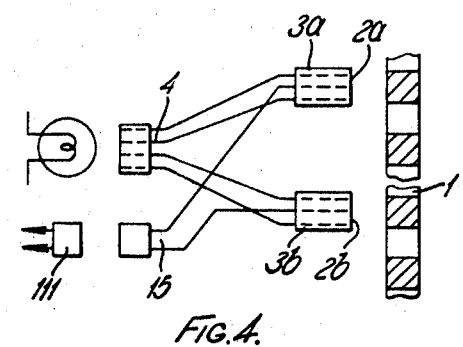
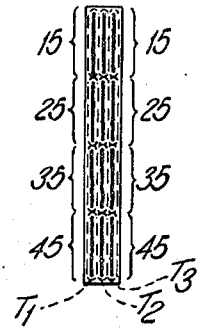

Filed July 28, 1966 2 Sheets-Sheet 2

United States Patent Office 3,384,755
Patented May 21, 1968

3,384,755
OPTICAL INSPECTION DEVICES
David T. N. Williamson, Douglas William Ballantyne Muir and Richard Graham Crosland, London, England, assignors to Molins Machine Company Limited, London, England, a corporation of Great Britain
Filed July 28, 1966, Ser. No. 568,569
Claims priority, application Great Britain, Aug. 4, 1965, 33,374/65
16 Claims. (Cl. 250—227)

This invention relates to optical inspection devices for use in measuring apparatus, e.g. where it may be required to measure relative movement between two objects by counting the number of marks of a scale which pass a fixed point.

In such apparatus it has been common to employ optical systems containing slits and lenses to focus a suitable image of the scale on a photoelectric transducer. Such systems are relatively complex and costly; if it is possible to view a scale by transmitted light, then a relatively cheap and simple arrangement of slits close to the scale will serve, but in many practical applications of such apparatus reflected light must be used, and when an illuminator and a viewer must be placed on the same side of the scale, neither can be close to it and hence the more complex optical systems are required.

In U.S. patent application Serial No. 513,702 filed Dec. 14, 1965, in the names of Douglas Wm. Ballantyne Muir and Philip Frank Hider, there is disclosed an optical inspection device including a first light-transmitting surface of a complementary form to that of articles to be inspected, a plurality of light conducting fibres each having one of its ends embodied in said surface, and means holding the other ends of said fibres in such positions as to form at least two groups, each group providing a further light-transmitting surface, the fibres being so assembled that the fibres in each group are associated with spaced areas of the first light-transmitting surface, said spaced areas also containing ends of fibres of at least one other group.

By "light-conducting fibres" we mean fine threads or strands of transparent material adapted to transmit light from end to end without substantial leakage of such light through their side walls. This is achieved with any rod or thread of transparent material having a refractive index substantially higher than the ambient air or other medium, as no appreciable proportion of light rays entering an end face of the rod or thread strike the walls thereof at a sufficiently small angle of incidence (measured from the normal) to be transmitted through said walls. The threads we employ are preferably held in intimate contact in their groups and therefore we prefer to employ composite or coated threads, e.g. glass threads each carrying a coating of glass of a suitably different refractive index, so as to ensure internal reflection at the interface between the two types of glass. Very conveniently, such composite threads may be in multiple-thread assemblies, each comprising a plurality of threads with a common coating; such assemblies are commercially available in tape-like form, containing a number (generally ten or twelve) parallel, uniformly-spaced threads encapsulated in their common coating. Such assemblies (hereinafter simply termed "tapes") are simpler to handle than single threads, which latter usually have a diameter of about five thousandths of an inch (one-eighth of a millimetre) and it is substantially simpler to group the ends of individual threads systematically when using such tapes than when using single threads assembled in bundles. The end faces of the threads are necessarily cut normal to the lengths of the threads and preferably are ground and polished to the standards of so-called "optical flats."

We have now found that a modification of such a device can with advantage be employed in a measuring apparatus, i.e. in inspecting a scale. Generally the scale is on a plane surface and the first light-transmitting surface is also plane but other formations are possible, e.g. the said surfaces may be coaxial cylindrical surfaces.

According to the present invention, therefore, we provide measuring apparatus comprising a scale and an inspection device, said device incluidng a plurality of light-conducting fibres each having one of its ends embodied in a composite light-transmitting surface confronting said scale, means holding the other ends of said fibres in such positions as to form at least two groups, each group providing a further light-transmitting surface, an illuminator confronting one of said further surfaces, and a photo-electric cell or the like confronting each of the remaining further surfaces, the ends of the fibres of the first group being arranged in the composite surface in lines or bands corresponding to markings on the scale, each of said lines or bands containing ends of fibres of at least one other group.

In one simple form of the invention, the scale is in the form of a reflective grating, i.e. it comprises parallel bands alternately of reflective and non-reflective character; the inspection device then has two groups of fibres, and in the composite surface the ends of the fibres of said two groups occupy alternate parallel bands of width equal to those of the bands of the scale. The spacing between the scale and the composite surface is kept very small, preferably being of the same order as the width of one band of the scale, and it is then found that if the scale is moved across the composite surface, in a direction normal to the bands, the photo-electric cell will be intermittently illuminated; this arises because light travels from the illuminator via the fibres of one group to the composite surface and thence to the scale. Any light reflected from the scale tends to scatter and some light therefore reaches fibres of the second group, in adjoining bands of the composite surface. The amount of light so travelling varies according to the relative positions of the bands of the scale and of the composite surface, hence during relative movement therebetween extending to a plurality of band-widths there will be a cyclical variation of illumination of the photo-electric cell (and hence of its electrical output) as with know systems employing two superposed gratings through which light is transmitted.

Preferably, however, we make the composite surface of the inspection device of a width equal to that of one band (light or dark) of the scale, and arrange the ends of the fibres of two groups in alternate rows, parallel to the bands of the scale, along the composite surface. The composite surface therefore may have as a minimum two rows of fibre ends, each row containing the ends of fibres of a different group or groups. Preferably however the arrangement is symmetrical, e.g. we may form the composite surface with three rows of fibre ends; the fibres of the two outer rows then form one group, the further light-transmitting surface of which confronts the illuminator, while the fibres of the inner row form a second group associated with a photo-electric cell. Another possible arrangement is to dispose the fibre ends of the two groups in the composite surface in a similar manner to that of the black and white squares of a chess-board, i.e. so that fibre ends of the two groups alternate in each row and in lines across the rows; this last arrangement however is somewhat more difficult to construct.

In a more elaborate form of the invention, the fibres are formed into five groups. As before, the fibres of one group have ends forming alternate parallel rows in the composite surface, their other ends confronting the illuminator; the remaining fibres provide the intervening row or rows of ends and are so arranged that the fibres of each of the other four groups have ends in a different zone of the composite surface, i.e. the ends associated with the four groups respectively occupy four portions of the lengths of the row or rows. The composite surface is so disposed relative to the scale that their respective bands are slightly inclined relative to one another, and when there is relative movement between the scale and composite surface as before, optical fringe effects arise as with a pair of gratings similarly disposed; in the case of gratings, the fringes can be seen to travel across the superposed gratings, such fringes extending transversely of the bands of the gratings and travelling along the length of said bands. With the apparatus of the invention, it will be appreciated that it is not possible for this effect to be seen but a corresponding result is achieved in terms of the variation of illumination of the several zones of the composite surface during the aforesaid relative movement. The four zones may be variously selected but we prefer to select the zones so that the cyclic illumination of each during such relative movement is 90°, 180° and 270° out of phase with that of the others respectively.

We find it advantageous to provide a substantial number of fibres to convey light to the or each photo-electric cell or the like; however practical considerations limit the number of fibres available when the ends of all such fibres, together with the ends of fibres conveying light to the scale from the illuminator, have to confront a single band of the scale simultaneously. A convenient solution to this problem is found by, in effect, arranging for the composite light-transmitting surface to be formed in two or more spaced portions. For example, we may employ two or more fibre assemblies, each comprising a single row of fibres of the group associated with the photo-electric cell lying between two rows associated with the illuminator, the ends of the three rows forming a portion of composite surface corresponding in area to one band of the scale. The assemblies are mounted so as to be mutually parallel and spaced along the length of the scale as desired; so long as the spacing (measured between centres along the scale) between any pair of assemblies is a whole-number multiple of the width of two bands (one light, one dark) of the scale, then both or all the assemblies will function in phase.

Such assemblies are especially simple to make when tapes (as hereinbefore explained) are employed in place of individual fibres or threads, as each row of fibres may be formed by one or more tapes laid side by side. The assemblies, whether of tapes or of individual threads, may be secured to spacer members adapted to be stacked without damage to the assemblies carried thereon, the dimensions of the spacer members then determining the relative positions of the several assemblies.

A simple form of spacer member comprises what may be termed a thick rectangular washer, of such size that one of the fibre assemblies can be carried on its upper surface leaving unoccupied boundary strips on each side of the assembly.

The lower surface of the spacer member is provided with a central channel, of width and depth somewhat greater than one of the fibre assemblies, and the spacer member can therefore be placed upon a similar spacer member also carrying a fibre assembly and will be supported by the unoccupied boundary strips of the upper surface of the latter. Any number of such spacer members can be stacked, and it will be appreciated that the fibre assemblies will be spaced, each from the next, by the thickness of the spacer member carrying the upper one of said assemblies. To preserve accurate spacing, the spacer members must be held firmly together; desired alignment of the assemblies may be secured by accurate dimensioning of the spacer members, which may be enclosed in a housing of corresponding internal dimensions.

In order that the invention may be well understood, preferred embodiments thereof will now be described with reference to be accompanying diagrammatic drawings, in which:

FIGURE 1 is a plan view of one form of apparatus embodying the invention;

FIGURE 2 is a detail view, in section, of part of FIGURE 1;

FIGURE 3 is a side view of a more complex form of apparatus;

FIGURE 4 is a plan view of the apparatus of FIGURE 3;

FIGURE 5 is a diagram showing the relationship between fibre ends and scale in the apparatus of FIGURE 3;

FIGURE 6 shows a part of the composite surface of the apparatus of FIGURE 3 and the arrangement of fibres therein;

Figure 7:
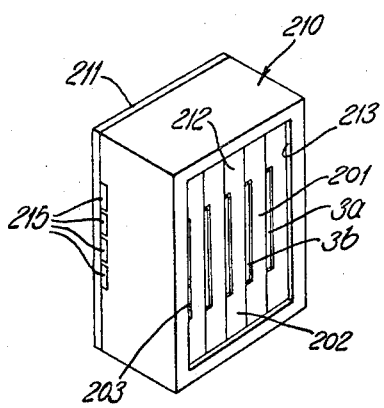
FIGURE 7 is a perspective view showing a preferred mode of assembly of part of the apparatus of FIGURE 3.

Referring first to FIGURES 1 and 2, the apparatus shown here comprises a scale 1 confronted by a composite light-transmitting surface 2; the surface 2 is one face of a block 3 in the form of a plurality of coated glass fibres encapsulated in synthetic resin or the like and having their ends in the composite surface finished as optical flats normal to the length of the fibres. The scale 1 has on its face alternate reflective and non-reflective bands as indicated by shading. The fibres projecting behind the block 3 are fromed into two groups 4, 5 and their other ends are similarly finished and encapsulated in respective blocks 6, 7 providing further light-transmitting surfaces 8, 9 confronted, respectively, by a lamp 10 and a photo-electric cell 11.

The fibres formed into the group 4 have their ends in alternate parallel bands of the surface 2 and the fibres formed into group 5 have their ends in the intervening bands of the surface 2. This is more clearly seen in FIGURE 2 (where the groups to which the fibres go are indicated by the bracketed references 4, 5). Also from FIGURE 2 it can be seen that the widths of the bands of fibres correspond to the widths of the bands of the scale 1.

It will be appreciated that when the scale 1 moves horizontally in its own plane, as indicated by arrow 12, the bands of the scale 1 and surface 2 will move cyclically into and out of aligned positions. At any instant, light from the lamp travelling through the fibres of group 4, and emerging through the associated bands of the surface 2 as a slightly divergent beam in known manner, may meet reflective or non-reflective bands of scale 1 according to the relative positions of the scale 1 and surface 2 at the instant. When any of such light is reflected by a reflective band of scale 1, it may reach a band of surface 2 containing fibres of group 5 and in that event such reflected light will reach the photoelectric cell 11. The maximum illumination of the cell 11 is achieved whenever each reflective band of scale 1 is symmetrically disposed over a boundary between adjoining bands of surface 2, and a minimum illumination of the cell 11 whenever the bands of scale 1 and surface 2 are aligned as in FIGURE 2; for convenience in considering the function of the apparatus one may therefore with advantage consider that each band of surface 2 is not associated solely with fibres of one group, but instead one may regard a band as meaning several rows of fibre ends of group 4 together with neighbouring rows of fibre ends of group 5. When one considers the surface 2 as divided into bands in this manner, it will be seen that maximum illumination of cell 11 corresponds to alignment of the bands of the surface 2 and of the scale.

Thus during continuous movement of scale 1 past surface 2 produces a cyclic illumination of the cell 11, which thereofre delivers a pulsating electrical output, whose frequency represents the speed of movement of scale; the total number of pulsations in any time represents the total displacement of scale 1 in that time.

The foregoing description, referring to FIGURES 1 and 2, is of a simple form of apparatus which is relatively inefficient; as will be realized, the passage of light from fibres of group 4 to fibres of group 5 only occurs to any substantial extent between the fibres at the edges of bands of surface 2.

Turning to FIGURES 3 to 7, there is shown a more complex form of apparatus. The elements of this form which correspond to those of the simple appaartus of FIGURES 1 and 2 are more efficiently arranged; referring first to the plan view, FIGURE 4, it will be seen that a block 3a (corresponding to block 3 of FIGURE 1) contains only three rows of fibres. The fibres of the outer rows are incorporated in group 4, as before, and are associated with the illuminator while the fibres of the central row are fibres of a group 15 (corresponding to group 5 of FIGURE 1) and are associated with a photo-electric cell, here cell 111. The width of the three rows corresponds to that of one band of the scale 1. It will readily be seen that (considering only the parts of FIGURE 4 so far mentioned) maximum illumination of cell 111 is obtained when a light band of scale 1 is aligned with the block 3a, minimum illumination occurring when a dark band is so aligned.

The arrangement of fibre ends in the surface of the bolck 3a is shown in FIGURE 6, on which the fibre group references of FIGURE 3 are shown to identify the various fibre ends. It will be seen that, structurally, the block 3a has three rows of fibres, and each row of fibres has four sections, corresponding to four zones to be explained, each section being shown as formed by one of the "tapes" described above, i.e. the fibres of the group are encapsulated in a common coating; the three tapes at the bottom of FIGURE 6 are identified by references T1, T2, T3. The block itself is formed by casting any convenient encapsulation medium around the assembled tapes. (It will be appreciated that available fibre tapes may not contain enough fibres for a single tape to constitute a complete section, in which event two or more tapes may be laid side by side to form a section.)

Turning now to the general arrangement shown in FIGURES 3 to 7, the fibres which in FIGURE 1 were all contained in group 5 are here arranged in four groups 15, 25, 35, 45 with associated photo-cells 111, 211, 311, 411 respectively associated with different zones of surface 2. The said zones are substantially horizontal rectangles each occupying a quarter of the area of surface 2; fibre group 15 is associated with the uppermost of said zones, group 25 with the next zone down, group 35 with the third zone from the top, and group 45 with the lowermost zone.

Expressed another way, each zone of the surface 2 corresponds exactly to the surface 2 of FIGURES 1 and 2; in the uppermost zone the fibres go to groups 4 and 15, in the next zone down they go to groups 4 and 25, and so on.

There is in this form of apparatus a slight but important difference in the relative disposition of scale 1 and surface 2, in that the bands of the two members are not all vertical; the block 3 (here in two sections 3a, 3b) is canted so that the bands of surface 2 are slightly inclined, the angle of inclination being such that at the top of the surface 2 any one band thereof is horizontally displaced two band-widths as compared with its position at the bottom of the surface 2; this is illustrated in FIGURE 5.

The effect of this slight inclination is similar to that obtained when two gratings are superposed. As can be seen from FIGURE 5, considering this diagram as showing two gratings having alternate opaque and clear bands, at any instant one can see that at certain levels the bands of the two gratings are in register, clear over clear, opaque over opaque, so that maximum light transmission is possible. Halfway between any such level and the next, the bands are exactly out of register and no light can be transmitted. The transition from maximum to zero transmission is progressive along the length of the bands; if there is horizontal relative movement between the gratings, there will be the appearance of light and dark bands moving substantially vertically. Hence, in zones such as those of the surface 2 above described, there will be cyclical illumination as scale 1 moves horizontally, but as between each of the zones and its neighbour the phase of such cyclical illumination will be 90° different; i.e. if say, the uppermost zone is taken as the standard (0°), the illumination of successively lower zones will be 90°, 180° and 270° shifted in phase.

The arrangement of the fibres in the surface 2 of the apparatus of FIGURES 3 to 7 gives, with the scale 1, an effect similar to that of the gratings just discussed. Hence, it will be appreciated, the apparatus of FIGURES 3 to 7 will, on horizontal movement of scale 1, give similar pulsating electrical outputs from the four photo-electric cells 111, 211, 311, 411 but the said outputs will be differently phased—as above, if the output from cell 111 be taken as the standard, the outputs from cells 211, 311 and 411 will be out of phase by 90°, 180° and 270° respectively. This type of multiple, phase-related output is known to be useful e.g. where the apparatus is used in automatic positioning mechanism.

The outputs of the photo-electric cells may be employed separately but it is convenient (as shown in FIGURE 3) to connect the cells in pairs, cell 111 with cell 311 and cell 211 with cell 411, to give only two electrical outputs on leads X, Y respectively. The actual mode of connection is that known as "series opposition," i.e. so that when each cell of a connected pair is identically illuminated, the electrical output is zero as identical voltages from the two cells are combined subtractively. The result is, as will be apparent, that as scale 1 moves past the block 2, alternating electrical outputs with a 90° phase difference appear at X, Y.

So far, reference has been made largely to FIGURES 3 and 5, but FIGURE 4 illustrates the fact that in this form of apparatus, the block 3 is in fact formed in two or more portions; in FIGURE 4, two portions 3a, 3b are shown. The two portions are identical to one another and the fibres of said portions are identically associated in the fibre groups and hence with the illuminator and with the several photo electric cells (in FIGURE 4 only one of the cells, cell 111, is shown, with its associated block 15; the remaining cells and blocks are of course similarly disposed at lower levels). It will be noted that both the portion 3a and the portion 3b are shown as confronting a dark band of the scale 1, i.e. said portions are spaced by a distance (between centres) equal to a whole-number multiple of the width of two bands of the scale, hence at any instant the illumination of the cell 111 due to light passing via block portion 3a is equal to that due to light passing via block portion 3b i.e. the provision of the two portions doubles the effect on the cell, as compared with that obtained if only one of the portions 3a, 3b were provided. In a similar way, three or more spaced block portions may be provided, to give three or more times the effect on each photo-electric cell.

FIGURE 7 illustrates a mode of construction of a plurality of spaced block portions, as required by the arrangement just described. It will be seen that the block portions 3a, 3b are each secured (e.g. by adhesive) to the upper surface of a spaced washer 201, 202 respectively. Each of said washers is of steel and is of rectangular form (as viewed parallel to the plane of the figure); the upper surface of each washer is plane, as are all its four edges. The lower surface however has a central channel 203, so dimensioned that when the washers are stacked, each block portion 3a, 3b lies within the channel 203 of the washer next above, the latter resting upon unoccupied boundary strips of the upper surface of the lower washer. Any desired number of such washers may be stacked, according to the number of block portions employed, and as an arbitrary example two further block portions are shown, making a total of four. Five washers are however shown, the uppermost one not carrying a block portion on its upper surface but merely providing protection for the uppermost block portion, carried on the upper surface of the next to uppermost washer.

The stack of washers is as shown enclosed in a housing 210 of rectangular section to locate accurately the spacer washers, and hence the block portions. The housing 210 has one face 212 substantially open, to expose the light-transmitting surfaces (e.g. surfaces 2a, 2b) of the several block portions. This open face 212 is however bounded by flanges 213, projecting from the adjoining faces to give positive location of the stack of washers and block portions. Conveniently, once the whole assembly is properly assembled in the housing 210, and the fibre tapes emerging from the several block portions are suitably disposed, all remaining space in the container is filled with any convenient "potting" medium e.g. an epoxy resin, and a cover or lid 211 placed in position to complete the housing 210. The housing is sufficiently large to allow space, at the side of the stack of washers remote from the open face 212, for the tapes to be arranged in their groups 15, 25, 35, 45 (FIGURE 3) and brought in correct grouping to fill apertures 215 in a side wall of the housing with the other ends of the fibre tapes, so that the further light-transmitting surface provided by each group of fibre tapes is formed in a corresponding one of the apertures 215. The photo-electric cells 111, 211, 311 and 411 (not shown in FIGURE 7) are then mounted on or adjacent to the outside of the housing 210 in alignment with apertures 215. Similarly a further aperture (not visible in FIGURE 7) is provided in another side face of the housing 210 to accommodate the fibre tapes of group 4 in similar fashion and the illuminator is then mounted on or adjacent to said other side face.

Figure 8:
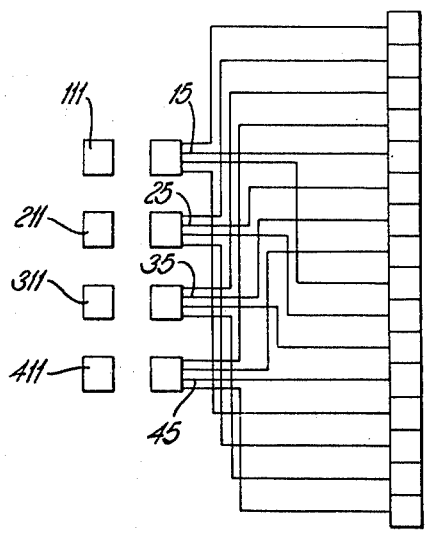
FIGURE 8 is a diagram of a modification of the apparatus of FIGURE 3.

Referring briefly now to FIGURE 8, this shows part of a more elaborate arrangement essentially similar to that of FIGURE 3. In FIGURE 8, it will be seen that there is provision for viewing the scale in sixteen zones, in place of the four of FIGURE 3. Considering the uppermost group of four zones, the corresponding fibres are of groups 15, 25, 35, 45 in that order, associated with cells 111, 211, 311, 411, as before. This disposition is repeated in the same sequence in each successive group of four zones. Thus, in aggregate, cell 111 is associated with the first, fifth, ninth and thirteenth zones (numbering from the top of the figure) cell 211 is associated with the second, sixth, tenth and fourteenth zones, and so on. In each group of four zones, the relative positioning of the fibres and the scale is as shown in FIGURE 5, i.e. the angle of inclination of the fibre rows relative to the scale is the same as in FIGURE 5 so that over the whole sixteen zones the lateral displacement of the fibre rows relative to the bands of the scale is eight bandwidths.

It will be apparent that the operation of apparatus arranged as in FIGURE 8 is essentially similar to that of the apparatus of FIGURE 3; however, the sixteen-zone arrangement is beneficial whenever there is a liability to local unevenness of the scale markings e.g. due to dirty marks such as oily deposits. Such marks might, with the four-zone arrangement, affect one zone only and hence seriously impair operation of the apparatus. With the sixteen-zone arrangement, a mark completely blocking the passage of light in one zone gives a resultant error in the output of the associated photo-electric cell of only one-quarter. When an oily mark or other fault is relatively large, it affects several zones and (with the cells connected as in FIGURE 3) it will be seen that there will be some balancing out of errors.

Various other forms of apparatus may be produced within the scope of the invention. For example, the composite surface may have its fibre ends so arranged that a band associated with the illuminator is bounded on its two sides by further bands associated with different photoelectric cells and the electrical outputs of the latter may be taken to a differential amplifier, the widths of the bands being so selected that whenever illumination of one of the further bands increases, that of the other must decrease. In this arrangement, it is preferred that the bands of the composite surface should be one-half the width of the bands of the scale.

What we claim as our invention and desire to secure by Letters Patent is:

1. Measuring apparatus comprising a scale having band markings thereon and an inspection device, said device including a plurality of light-conducting fibres, a composite light-transmitting surface embodying one end of each of said fibres and confronting said scale, means holding the other ends of said fibres in such positions as to form at least two groups, further light-transmitting surfaces each embodying said other ends of the fibres forming a different one of said groups, an illuminator confronting one of said further surfaces, and a sensing device confronting each of the remaining further surfaces, the ends of the fibres in the composite surface being arranged in bands corresponding to the band markings on the scale, each of said bands containing the end of at least one fiber from said group confronted by an illuminator and at least one fiber from at least one of said remaining groups.

2. Apparatus as claimed in claim 1, in which the composite surface is of a width equal to that of one band marking of the scale and the fibre ends are disposed in rows extending lengthwise of said surface alternate rows of ends being ends of fibres of the group associated with the surface confronting said illuminator and the remaining rows each comprising ends of fibres of another group.

3. Apparatus as claimed in claim 2, in which the remaining rows contain ends of fibres of four other groups and the composite surface is so disposed relative to the scale that their respective bands are slightly inclined relative to one another.

4. Apparatus as claimed in claim 3, in which the fibre ends associated with the four groups respectively occupy four portions of the length of said remaining rows and the inclination between the respective bands is such that the bands are relatively displaced two band widths at one end of the composite surface as compared with their relative positions at the other end thereof.

5. Apparatus as claimed in claim 3, in which the fibre ends of each of the four regularly groups occupy four spaced portions of the length of said remaining rows, and the inclination between the respective bands is such that the bands are relatively displaced eight band widths at one end of the composite surface as compared with their relative positions at the other end thereof.

6. Apparatus as claimed in claim 1, in which the end portions of the fibres forming each of the light-transmitting surfaces are encapsulated in synthetic resin to form a block, one face of said block constituting the light-transmitting surface.

7. Apparatus as claimed in claim 1, in which the composite surface is formed in at least two spaced portions.

8. Apparatus as claimed in claim 7, in which the end portions of the fibres forming each portion of the composite light-transmitting surface are encapsulated in synthetic resin to form a separate block, one face of such block constituting said portion of the composite surface.

9. Apparatus as claimed in claim 8, in which at least two of said separate blocks are assembled with intervening spacer members in a stack held in a housing with an open face permitting access to the light-transmitting surfaces of said blocks.

10. Apparatus as claimed in claim 9, in which said spacer members are rectangular washers, each block being secured to one face of one of the washers so as to leave boundary strips on each side of said block unoccupied, the opposite face of each washer having a central channel of width and depth somewhat greater than one of said blocks.

11. Apparatus as claimed in claim 15, including at least two photo-electric cells with electrically interconnected output leads.

12. Apparatus as claimed in claim 4, in which four photo-electric cells are interconnected in pairs with the cells of each pair in series opposition, the four cells being so arranged that when the scale moves relative to the composite surface the cells produce varying electrical outputs with relative phases of 0°, 90°, 180° and 270° and the outputs of the cells of either pair differ in phase by 180°.

13. Apparatus as claimed in claim 1, in which the fibres are embodied in tape-like multiple assemblies each comprising a plurality of threads encapsulated in a common coating.

14. Measuring apparatus comprising a movable scale having band markings thereon and an inspection device, said device comprising a plurality of light-conducting fibers, one end of each of said fibers confronting said scale and the opposite ends of said fibers forming at least two groups, an illuminator confronting one of said groups, a light-sensing device confronting each of the remaining said groups, the ends of the fibers confronting said scale being arranged in bands corresponding to the band markings on said scale, each of said bands containing the end of at least one fiber from said group confronted by an illuminator and at least one fiber from at least one of said remaining groups.

15. Apparatus as claimed in claim 1 wherein said light-sensing device is a photo-electric cell.

16. Apparatus as claimed in claim 3 in which the fiber ends of each of the four groups occupy four spaced portions of the length of said remaining rows, whereby one of said groups is associated with every fourth portion numbering from one end of each of the rows and the inclination between the respective bands is such that the bands are relatively displaced eight band weights at one end of the composite surface as compared with their relative positions at the other end thereof.

References Cited
UNITED STATES PATENTS

| | | | |
|---|---|---|---|
| 3,096,441 | 7/1963 | Burkhardt | 88—14 |
| 3,120,125 | 2/1964 | Vasel | 250—227 |
| 3,344,700 | 10/1967 | Brake | 88—14 |

DAVID J. GALVIN, *Primary Examiner.*

JAMES W. LAWRENCE, *Examiner.*

W. J. SCHWARTZ, *Assistant Examiner.*